United States Patent [19]
Reneau

[11] Patent Number: 5,208,483
[45] Date of Patent: May 4, 1993

[54] AUTOMATIC POWER-OPERATED WINDOW AND ROOF PANEL SYSTEM FOR A MOTOR VEHICLE

[76] Inventor: Paul A. Reneau, 9261 N. 60th Street, Brown Deer, Wis. 53223

[21] Appl. No.: 938,510

[22] Filed: Aug. 31, 1992

Related U.S. Application Data

[63] Continuation of Ser. No. 542,962, Jun. 25, 1990, abandoned.

[51] Int. Cl.⁵ .................. H02P 1/04; H01H 43/00; H04M 11/00; B60J 7/057
[52] U.S. Cl. .................. 307/10.1; 180/271; 296/223; 307/141.4; 307/596; 318/466; 340/438; 379/63
[58] Field of Search .......... 307/10.1, 10.2, 34, 307/38, 39, 241, 596, 597, 598, 141, 141.4, 141.8; 361/191, 196, 178; 296/223, 117; 180/271, 289, 272; 318/266, 286, 466–469; 340/438, 425.5, 902; 379/105, 63, 59, 441, 447; 290/38 C

[56] References Cited

U.S. PATENT DOCUMENTS

| | | | |
|---|---|---|---|
| 4,019,171 | 4/1977 | Martelet | 340/134 |
| 4,198,573 | 4/1980 | Reneau | 307/10.1 |
| 4,329,594 | 5/1982 | Bohm | 307/10.1 |
| 4,649,286 | 3/1987 | Takeda et al. | 307/10.1 |
| 4,827,520 | 5/1989 | Zeinstra | 381/43 |
| 4,908,732 | 3/1990 | Davis, II | 361/170 |
| 4,933,610 | 6/1990 | Memmola | 307/10.1 |

FOREIGN PATENT DOCUMENTS 3730281 3/1989 Fed. Rep. of Germany ..... 307/10.1

OTHER PUBLICATIONS

Japanese Utility Model Patent Publication No. 61-128861, Aug. 12, 1986 and PTO translation.

Primary Examiner—A. D. Pellinen
Assistant Examiner—Richard T. Elms

[57] ABSTRACT

An electronic system for automatically operating the power-operated windows and roof panel in a motor vehicle. Also to provide driver and occupant safety and co]fort by controlling the vehicle's radio/stereo system, air conditioning/climate control system and other selected systems in response to calls placed or received on the vehicle's cellular phone or in response to changes in the vehicle's interior or exterior environment or both.

21 Claims, 2 Drawing Sheets

AUTOMATIC POWER-OPERATED WINDOW AND ROOF PANEL SYSTEM FOR A MOTOR VEHICLE

This is a continuation of application Ser. No. 07/542,962, filed on Jun. 25, 1990, now abandoned.

BACKGROUND OF THE INVENTION

1. Field of Invention

This invention relates to an automatic power-operated window system for a motor vehicle that operates in response to various inputs that are converted to electrical signals.

2. Description of Prior Art

Various systems have been developed to actuate the power-operated windows, roof panel and convertible top in a motor vehicle. The earliest of such devices were generally comprised of mechanical relays or other mechanical configurations containing contacts that are closed by actuating a circuit that contained a moisture conductive grid.

Typical were:
Almquist, U.S. Pat. No. 1,672,049
Crago, U.S. Pat. No. 1,913,699
Cromwell, U.S. Pat. No. 2,842,680
Johnson, U.S. Pat. No. 3,914,663
A more practical system employing timing circuits controlled by the vehicle's ignition switch and also operated in response to selected environmental changes was developed by:
Reneau, U.S. Pat. No. 4,198,573
This system was designed to employ means for stopping the automatic operation of the vehicle's power windows and roof panel by means of switches designed into the system's circuitry.

BRIEF SUMMARY OF THE INVENTION

The invention is a system comprised of electronic components and timers whose outputs drive relays to operate the power-operated window and roof panel systems in a motor vehicle automatically. The invention also utilizes the application of the vehicle's cellular phone to engage the system, and also to deactivate the vehicle's radio/stereo system, as well as activating the vehicle's air conditioning/climate control system. The invention also provides for deactivating the radio/stereo system by means of a switch that closes in response to selected audio frequencies exterior to the vehicle.

It is the principal object of the invention to provide a means to automatically operate the power-operated window and roof panel systems in both directions in a motor vehicle.

It is another object of the invention to provide the said means upon placing or receiving, and terminating a call on the vehicle's cellular phone.

It is a further object of the invention to provide a means for a quiet and comfortable environment during phone conversation by automatically deactivating the vehicle's radio/stereo system and activating the air conditioning/climate control system.

It is yet another object of the invention to provide means for deactivating the vehicle's radio/stereo system in response to selected audio frequencies external to the vehicle's passenger compartment, the said frequencies being those primarily of police and emergency vehicles.

DETAILED DESCRIPTION OF THE PREFERRED EMBODIMENTS

The description that follows describes an invention whose purpose is to provide convenience for the operator of a motor vehicle equipped with one or more of the following accessories; power-operated windows, power-operated roof panel, radio/stereo system, air conditioning/climate control system, cellular phone and a security (alarm) system.

It is often inconvenient to close power windows and roof panel prior to exiting the vehicle, or at any time during the operation of the vehicle. The present invention provides a means to automatically operate power windows and roof panel upon turning the vehicle's ignition 'OFF'. The present invention incorporates a method of warning the occupants that the windows and roof panel will close prior to the actual closing, and the invention provides several means to completely deactivate the system instantly to insure passenger safety by incorporating switches into the design. The present invention also provides a means to integrate the window and roof panel closing with other systems in the vehicle, such as the radio/stereo system, cellular phone and air conditioning/climate control system for additional driver and passenger comfort and convenience, as well as safety. Additional features and advantages of the invention will be described throughout the explanation of the preferred embodiments that follow.

Figure 1:
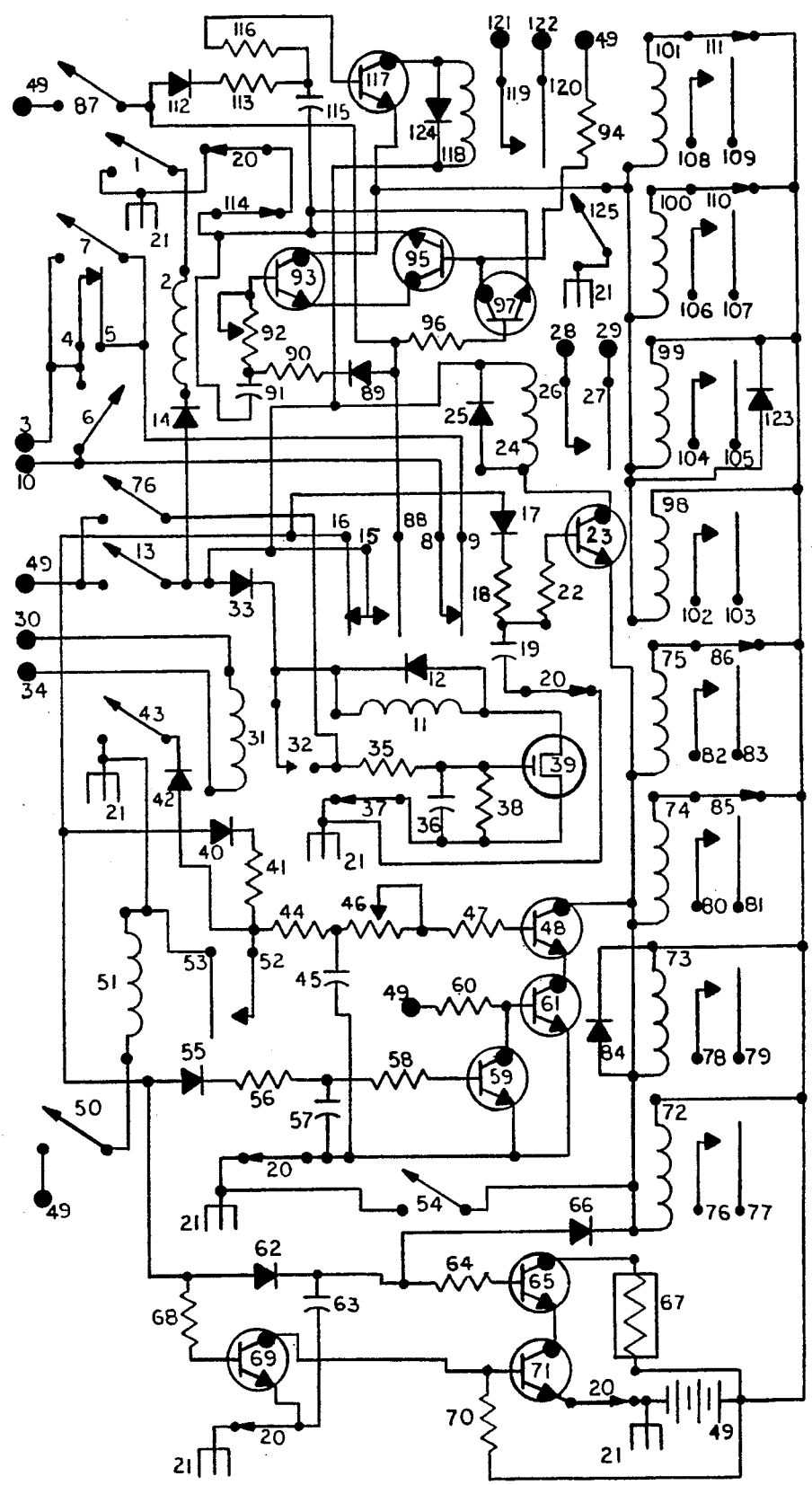
FIG. 1 is an electronic schematic containing the principal elements to which the present invention pertains according to the preferred embodiments.

Referring to FIG. 1, the system is activated by the vehicle's ignition switch being in the 'ON' position, thus closing switch 13 that is tied to the positive pole of the vehicle's storage battery at 49. A nominal voltage provides current through relay 11's normally closed contact pair 15 and 16 to charge capacitor 45. 45 will discharge through potentiometer 46 and current limiting resistor 47, thus forming an RC timing circuit to activate transistor 48, which energizes the coils of relays 72, 73, 74 and 75.

The activation of transistor 48 results from voltage from the battery's positive pole 49 by means of closed switch 13. This turns on transistor 59. The output of 59 reduces the voltage supplied from 49 and deactivates transistor 61. Voltage supplied to 59 also charges capacitor 57. Upon opening switch 13, diode 55 restricts the discharge of 57 only through resistor 58, thus forming an RC timing circuit to activate transistor 59 and maintains the deactivation of transistor 61. When the output of 59 diminishes to a point where it no longer deactivates 61, turn on voltage from 49 activates 61. The collector output of 61 supplies the emitter of transistor 48, thus allowing 48 to be activated for a time period based on the value of the RC timing constant consisting of capacitor 45, potentiometer 46 and current limiting resistor 47. A potentiometer wa selected for 47 in order to engage the said relays that activate the power windows and roof panel motors or motor actuators for variable time periods to accommodate the different motor speeds that may exist. The closing of 13 also results in the same series of events for the output of transistor 65 Voltage is supplied to charge capacitor 63 and to drive transistor 65. 65 will have appreciable output only when transistor 71 is activated. The emitter of 65 is tied to the collector of 71. Voltage from 49 also activates transistor 69, and the output of 69 reduces the voltage supplied to the base of 71 directly from 49 so that 71 is not turned on. Upon opening switch 13, 69 is turned off and 71 is turned on and provides an input to the emitter of 65, thus activating it. The output of 65 can be used to drive various loads, such as an illuminated indicator or buzzer, or 65 can engage the coil of a relay or solenoid. The preferred embodiment would be to activate or drive a warning device prior to engaging relays 72, 73, 74 and 75 which activate the power window and roof panel motors or motor actuators. This warning interval serves as a safety measure for the vehicle's occupants who may have placed objects in the path of the windows and roof panel prior to their closing. The output of 48 also serves to deactivate transistor 65 by shorting capacitor 63, thus eliminating the warning interval once relays 72, 73, 74 and 7$ have been engaged. Diode 66 restricts any charging of 63 that would result from voltage across the coils of the said relays. The warning interval can be maintained during the engaging of the said relays by opening the circuit between 48 and 63. This is accomplished by removing diode 66 from an actual circuit board. Relay 72 contacts 76 and 77 are normally open. When they are closed, they complete a circuit to activate a power window motor or motor actuator. Similarly, relay 73 contacts 78 and 79 are normally open. When they are closed, they also activate a power window motor or motor actuator. The motor or motor actuator is not considered part of the preferred embodiments. Relay 74 contacts 80 and 81 and relay 75 contacts 82 and 83 are also contained in circuits to activate the roof panel motor or motor actuator when closed. However, 74 and 75 are supplied with voltage from 49 through normally closed switches 85 and 86 respectively. These switches serve to limit the operation of the roof panel in lieu of current limiting switches that may not be included in the design of the roof panel's electric motor operation. Some roof panel designs are such that supplying them with power when they are in a desired position actuates the panel to another position, i.e., if the panel is closed, but the windows are open, engaging relays 72, 73, 74 and 75 would actuate the panel to the 'vent' position, which may be undesirable. 85 and 86 prevent this.

The deactivation of transistor 48 is also accomplished by providing a short to ground 21 for capacitor 45. Ground 21 is supplied by closing normally open switch 43, thus deactivating 48 and de-energizing the coils of 72, 73, 74 and 75 thus deactivating the power window and roof panel motors or motor actuators. Switch 43 is typical vehicle door jam switch that activates the vehicle's interior courtesy lights or other indicators by supplying ground 21 to the desired circuit. This switch serves to enhance safety so that opening a vehicle door would stop all window and roof panel movement. Many vehicles switch ground 21, however, other vehicles are designed with door jam switches that switch positive voltage 49. Normally open switch 50 is such a switch. In order to accommodate such vehicles, relay 51 with normally open contacts 52 and 53 is used. Contact 53 is tied directly to ground 21. Closing 50 supplies voltage 49 to the coil of 51, thus closing contacts 52 and 53. Closed contacts 52 and 53 provide a short path to ground 21 through resistor 44 to de-energize capacitor 45, thus deactivating transistor 48. Diode 42 prevents the possibility of unwanted charging of 45 by sources external to the preferred embodiments which may be tied the door jam switch 50. Resistor 41 serves as a load to prevent a high current short from the battery 49 to ground in the event the ignition switch is closed and one or more of the vehicle's doors is open, thus closing either switch 43 or 50. Relays 72, 73, 74 and 75 can also be engaged directly by providing ground 21 through normally open switch 54. Closing 54 energizes the said relays 72, 73, 74 and 75. The said relays will be energized as long as 54 is closed. The input at 54 can be from any selected source external to the preferred embodiments. Examples of inputs would be those from the vehicle's alarm system, or an environmental system or switch that would provide a ground output 21. The source of the ground output 21 forms no part of the preferred embodiments of this invention. It should be apparent that the addition of more relays to accommodate additional windows and roof panels would not change the preferred embodiments.

Again referring to FIG. 1, the introduction of cellular phones has given rise to safety concerns. Steering a vehicle and holding and dialing a phone can be awkward and also dangerous. This has resulted in the development of 'hands-free' cellular phones that are voice activated. Also, devices are available to deactivation the vehicle's radio/stereo system without the driver's assistance. The following preferred embodiments are an improvement over any that the inventor believes exist for deactivating the vehicle's radio/stereo system.

With switch 13 closed, voltage 49 reaches normally open reed switch 32. With coil 31 tied in series in the circuit between the source of power for the cellular phone 30 and the phone module 34, placing a call causes current to flow through the coil 31, thus generating a magnetic field that closes switch 32. This arrangement is a typical reed relay, however, reed relay coils typically operate and have maximum current ratings insufficient to operate a cellular phone. Also, the embodiment of coil 31 is unique based upon the characteristics of cellular phone operation. Cellular phones operate in two modes. One mode is a low current standby mode where typically less than 300 milliamperes are drawn, and the second mode is the operational mode during which two (2) to four (4) amperes or more are drawn. This difference between the standby mode current draw and the operational mode current draw allows the use of coil 31 to 'sense' a phone call. The number of turns comprising 31 is a function of both the field strength required to close reed switch 32, and the difference between the standby current and the operational current drawn by the phone. The greater the difference between the two modes, the less precise the number of turns comprising coil 31 has to be to close 32. With sufficient current through 31, switch 32, is closed and voltage 49 is supplied to current limiting resistor 35, capacitor 36 and resistor 38 and also to the gate of transistor 39. 39 is activated and engages the coil of relay 11, thus opening normally closed contact pairs 8 and 9; 15 and 16. 8 and 9 are in series in a circuit between the vehicle's radio/stereo system power source 3 and the radio/stereo system 10. Opening 8 and 9 deactivates the radio/stereo system 10. When a call is completed, the operational current of the cellular phone is reduced to standby current and reed switch 32 returns to its normally open position, thus reactivating the radio/stereo system 10. The said circuit comprised of 3, 9, 8 and 10 also has a normally open switch 6 between the radio/stereo system power source 3 and the radio 10, to override the deactivation of 10 if desired by the driver. Switch 6 also serves to eliminate unwanted radio deactivation when traveling in areas where false phone signals occur.

FIG. 1 also exhibits the addition of the activation of the vehicle's power windows and roof panel in conjunction with the deactivation of 10. It is not only desirable to deactivate 10 automatically when receiving or placing a call on the vehicle's cellular phone, but it would be desirable to automatically operate the power windows and roof panel so that the driver is able to have more steering control at all times by maintaining hands on the steering wheel. Relay 11 normally closed contacts 15 and 16 are opened when a call is placed or received on the phone. 15 and 16 are in series with switch 13 and therefore, the opening 15 and 16 is the same as opening 13, Once 13 has been closed. This results in the activation of transistor 48 and transistor 65. 13 is closed when the vehicle's ignition is in the 'ON' position, which is the position the ignition switch would be in when the vehicle is driven. A call placed or received results in the following sequence of events:

1. The radio/stereo system is deactivated.
2. The warning interval begins.
3. The windows and roof panel begin to close.
4. The warning interval is terminated.

Terminating a call closes contacts 15 and 16 and stops the sequence of events by deactivating transistor 48 as previously described. Opening switch 37 deactivates transistor 39, activates the radio/stereo system 10 and terminates all power window and roof panel movement resulting from closing contacts 15 and 16. Capacitor 36 and resistor 38 smooth out the operation of relay 31 and eliminate 'chatter' that might occur in conjunction with closing switch 32 and the activation of transistor 39.

FIG. 1 also exhibits how the vehicle's air conditioning/climate control system is activated in conjunction with the automatic operation of the power windows and roof panel. It would also be desirable to provide a comfortable environment automatically during phone conversation, in addition to deactivating the radio and automatically operating the windows and roof panel. Voltage is supplied from 49 with switch 13 closed by means of relay 11 closed contacts 15 and 16, to charge capacitor 19. Voltage is also supplied to transistor 23, however, the emitter of 23 is tied to the collector of 48. Therefore, 48 must have an output in order for 23 to be activated. When 15 and 16 are normally closed, 48 is not activated as described previously, however, engaging relay 11 opens 15 and 16 and closes 15 and 88, thus activating 48. Output from 48 is supplied to 23. 19 discharges through 22 to activate 23 for the time period based on the values of 19 and 22. Most electronic air conditioning/climate control systems are activated by a momentary push button switch, and thus, the time that 23 is activated is probably less than one second. The output of 23 engages relay 24 whose normally open contacts 26 and 27 are in series in a circuit from the energy source for the air conditioning/climate control system 28 and the desired control circuit that turns the system 29 on. The connections to 28 and 29 would be in parallel with the vehicle's existing momentary switch that turns on the said system, and engaging 24 momentarily would thus activate the said system. This occurs only when 48 is activated and results in the automatic operation of the power windows and roof panel as previously described. Therefore, the only time the air conditioning/climate control system would be activated automatically when a call is placed or received on the vehicle's cellular phone is when the windows and roof panel would operate automatically. If the basic system is turned off by means of switch 20, then the automatic operation of the windows and roof panel would not be desired, so there would be no need to turn on the air conditioning/climate control system. Another means exists to activate 39. Closing normally open switch 76 results in the activation of 39, and thus the operation of the air conditioning/climate control system and the power windows and roof panel. 76 is part of the invention's embodiments, however, the means by which 76 is closed, or the construction thereof would not be. The radio/stereo system would also be deactivated.

Figure 2:
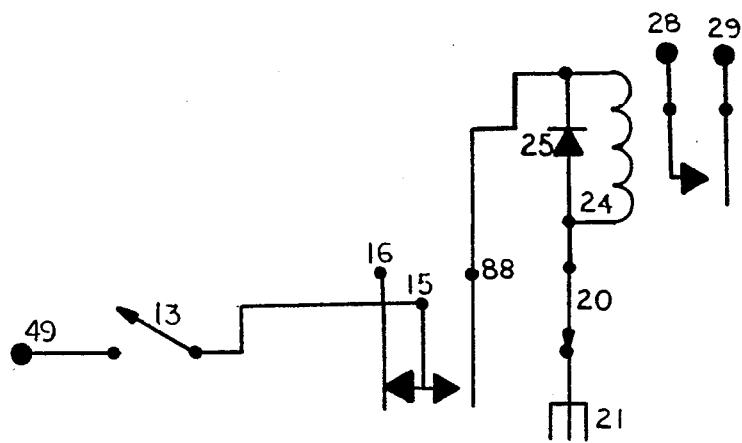
FIG. 2 is a variation in that section of FIG. 1 that pertains to the operation of the air conditioning/climate control system in vehicles that are not electronic, and thus are operated manually.

Referring to FIG. 2, some vehicle air conditioning systems are operated manually, and therefore require that a lever be moved to the desired position for air conditioning. In order to accommodate vehicles with this type of air conditioning system, relay 24 must be energized for the entirety of the call. One end of the coil of 24 is tied directly to contact 88. The other end of the coil is tied to ground by means of closed switch 20. Therefore, if the windows and roof panel close in response to a call with 20 closed, relay 24 normally open contacts 26 and 27 close, thus closing the circuit the circuit from the power source 28, to the air conditioning system 29. 28 and 29 would be in parallel with the air conditioning system's 'ON' switch as similarly described for the electronic air conditioning. Upon termination of the call, relay 11 contacts 15 and 88 open and deactivate the air conditioning system. Unlike the operation of the electronic air conditioning/climate control, activating the system's 'OFF' switch is not necessary, and therefore, no circuitry is required to do this. The system, however, will not remain on, as is the case when the electronic air conditioning/climate control is activated.

Figure 3:
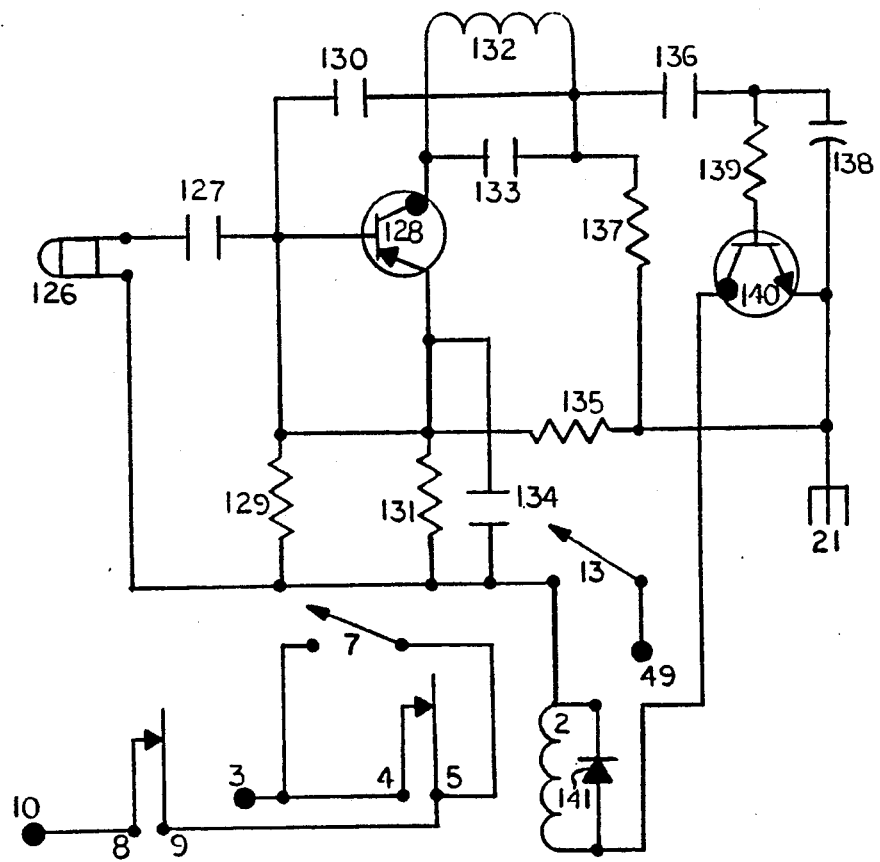
FIG. 3 is a schematic of an input in FIG. 1 for one of many methods of audio frequency detection used as an input in FIG. 1.

Referring to FIG. 3, a method is shown to deactivate the vehicle's radio/stereo system in response to selected audio frequencies. A simple bandpass tuned amplifier is described. The audio frequency is picked up by microphone 126. The resonant circuit comprising of choke 132 and capacitor 127 is tuned to the desired frequency of police or emergency vehicles by selecting the values of the choke in henries, and the capacitor in microfarads. This circuit, together with capacitor 130 forms a negative feedback path from the collector of transistor 128, except at resonant frequency. In other words, at all other frequencies except that which is desired, the feedback present reduces the gain of 128 to virtually zero. The resonant frequency of the input signal, however, provides no feedback, and thus the signal is passed by the amplifier with full gain. The output of 128 passes through capacitor 136 as an output to drive relay 2. Capacitor 138 and resistor 139 serve to eliminate any 'chatter' in relay 2. This tuned amplifier would constitute switch 1 in FIG. 1, with the ground output 21 tied to the coil of 2 which is comprised of normally closed contacts 4 and 5. The other side of the coil of 2 is tied to the battery 49 by means of switch 13. Therefore, the vehicle's ignition must be on. With the ignition off, 13 is Open and relay 2 cannot be engaged. 4 and 5 are in series in a circuit from the radio's power source 3, relay 11 contacts 8 and 9, to the radio. With switch 6 open, closing switch 1 deactivates the radio. As long as the input or resonant frequency exists and is detected by the microphone 126, the radio will be deactivated, unless switch 7, which is in parallel with contacts 4 and 5 is closed. 7 provides a means to override the opening of 4 and 5 in lieu of closing normally open switch 6, that may be of a different construction. This construction serves to assist a driver who may not be aware of oncoming police or emergency vehicles because the radio/stereo system is being operated at volume levels that make it impossible to hear the police or emergency vehicle's siren. These vehicles often proceed through traffic signals without having the right-of-way as defined by the traffic sign or signal, thus creating a situation that could result in an accident. It would therefore be desirable to locate the microphone or pickup device for the above construction external to the passenger compartment where the described resonant frequency could be identical to that contained in music being listened to on the radio/stereo system.

Referring to FIG. 1, it may also be desirable to open the vehicle's windows and roof panel and deactivate the air conditioning/climate control system upon terminating a call on the vehicle's cellular phone. Relay 11 has a normally open contact 88 common to contact 15, as well as to contact 16. This constitutes a double throw relay arrangement. When transistor 39 is activated, relay 11 contacts 88 and 15 are closed. Voltage from the battery 49, through switch 13 which is closed with the ignition on, charges capacitor 91. Voltage is also supplied from 49 to activate transistor 95. However, the output from transistor 97 deactivates 95 as long as 39 is activated. Upon deactivating 39, 95 is turned on. 95 has its collector tied to the emitter of 93. Capacitor 91 and potentiometer 92 constitute an RC timing constant and supply voltage to the base of 93 to activate it. The collector of 93 is tied to one side of the coils of relays 98, 99, 100 and 101 Therefore, activating 93 engages the said relays. 100 and 101 have normally closed switches 110 and 111 respectively between their said coils and 49, for controlling their operation. These two relays would correspond to relays 74 and 75 in the operation of the vehicle's roof panel as previously described. The energizing of the said relays, and the closing of their corresponding contacts enable the power windows and roof panel to be automatically operated in the reverse direction to that previously described. Normally open switch 87 is an additional means to activate transistor 93, thus achieving the same result of reversing the direction of the automatic operation of the windows and/or roof panel if relay 11 is not activated by a phone call or other means described previously. 87 would be required to close only momentarily, thus charging capacitor 91, creating the RC timing means to activate 93.

As previously described, the air conditioning/climate control system is activated automatically when the ignition is on and the windows and roof panel close automatically as a result of activating transistor 39. It would also be desirable to provide a means to automatically deactivate the air conditioning/climate control system when reversing (opening) the direction of the windows and roof panel.

Referring to FIG. 1, with relay 11 contacts 15 and 88 closed, voltage from 49 charges capacitor 115, and is also supplied to the base of transistor 117. The emitter of 117 is tied to the collector of 93, therefore, 93 must be activated in order for 117 to be activated. 117 is tied to the coil of relay 118, and the closing of its normally open contacts 119 and 120 can occur only if the ignition is on and the power windows and roof panel have been activated in the reverse direction by relays 98, 99, 100 and 101. Relay 118 contacts 119 and 120 are connected in parallel with the air conditioning/climate control system's 'OFF' switch between the power source 121 and the switch 122. Therefore, reversing the direction of the window and roof panel movement deactivates the air conditioning/climate control system. Also, 117 would be activated only momentarily, and the RC timing constant consisting of capacitor 115 and resistor 116 would generally be less one second or less.

The objects set forth above and those apparent from the described preferred embodiments are effectively attained, and it is understood that certain changes may be made in the above construction without departing from the scope of the invention. It is also understood that the following claims are understood to cover all generic and specific features of the invention described herein, and all statements defining the scope of the invention as a matter of language, might be said to fall therebetween.

Having described the invention, what is claimed is:

1. An improved system for automatically activating power-operated window and roof panel motors and motor actuators in a motor vehicle so equipped, the system is comprised of:

a vehicle battery with a positive pole and a negative pole wherein said negative pole is connected to a vehicle ground, two groups of relays, each relay of said two groups has a set of normally open contacts, each said set of contacts is in a separate circuit between said vehicle battery and a single motor or motor actuator to operate said single motor or motor actuator in one direction, two controlling circuits for operating said two groups of relays, a first circuit that controls the operation of a first group of relays, said first circuit is comprised of:

a first switch that is closed by closing an ignition switch of the vehicle, said first switch is normally open and tied to said positive pole of the vehicle battery, said ignition switch is also tied to said positive pole of the vehicle battery, a first transistor arrangement to operate said first group of relays, said first transistor arrangement is comprised of:

said first switch, a first timer that activates a first transistor, a second timer that activates a second transistor, said first timer and said second timer both are activated by closing said first switch, said first transistor is disabled by closing said first switch, said first transistor is enabled by opening said first switch and also by activating a first prime transistor, said first prime transistor has a base tied to said positive pole of the vehicle battery and said first prime transistor also has a collector tied to an emitter of said first transistor, said second transistor has a base tied to said first switch, said second transistor also has a collector tied to said base of the first prime transistor, activating said second transistor disables said first prime transistor, all of the coils of said first group of relays are in parallel with each other and tied together at an end of each of said coils, an other end of each of said coils of said first group of relays is tied to the positive pole of the vehicle battery, said first transistor has a collector tied to said end of each of said coils of said first group of relays, opening said first switch after said closing said first switch activates said first transistor, activating said first transistor engages said first group of relays, engaging said first group of relays energizes said motors or motor actuators in a first direction, a second circuit that controls a second group of relays, said second circuit is comprised of:
  a second switch that is not closed by closing said ignition switch of the vehicle, said second switch is normally open and tied to said positive pole of the vehicle battery,
  a second transistor arrangement to operate said second group of relays, said second transistor arrangement is comprised of:
  said second switch,
  a third timer that activates a third transistor,
  a fourth timer that activates a fourth transistor,
  said third timer and said fourth timer both are activated by closing said second switch, said third transistor is enabled by a second prime transistor, said second prime transistor has a base tied to said positive pole of the vehicle battery, said second prime transistor also has a collector tied to an emitter of said third transistor, said fourth transistor has a collector tied to said base of said second prime transistor,
  activating said fourth transistor disables said second prime transistor, all of the coils of said second group of relays are in parallel with each other and tied together at an end of each coil, an other end of each of said coils of said second group of relays is tied to said positive pole of the vehicle battery, said third transistor has a collector tied to said end of each of said coils of said second group of relays,
  opening said second switch after closing said second switch activates said third transistor,
  activating said third transistor engages said second group of relays, engaging said second group of relays energizes said motors or motor actuators in a second direction, closing said first switch disables closing said second switch.

2. The system recited in claim 1, wherein said first circuit that controls said first group of relays is also comprised of:
said first switch,
an electrically-operated warning device having
  a first electrical lead tied to said positive pole of the vehicle battery and
  a second lead,
a third transistor arrangement to operate said warning device, said third transistor arrangement comprised of:
  a fifth timer that activates a fifth transistor, said fifth timer is activated by closing said first switch,
  a sixth transistor activated by closing said first switch, said sixth transistor disables
  a third prime transistor, said third prime transistor has a base tied to said positive pole of the vehicle battery, said third prime transistor also has a collector tied to an emitter of said fifth transistor, activating said third prime transistor enables said fifth transistor, said fifth transistor also has a collector tied to said second electrical lead of said warning device, with said fifth timer activated said enabled fifth transistor activates said warning device.

3. The system recited in claim 2, wherein engaging both said first group of relays and said second group of relays is controlled by operating a third relay, said third relay has a double throw contact arrangement comprised of:
  a first set of contacts, said first set of contacts is normally closed and in a circuit that controls the operation of said first group of relays, said first set of contacts is located between said first switch and said first timer,
  a second set of contacts, said second set of contacts is normally open and in said second circuit that controls the operation of said second group of relays, said second set of contacts is located between said first switch and said second timer,
engaging said third relay opens said first set of contacts and closes said second set of contacts.

4. The system recited in claim 2, wherein an end of the coil of said third relay is tied to said first switch, an other end of the coil of said third relay tied to an output of a seventh transistor, said seventh transistor output enables energizing said coil of said third relay, said third relay is engaged by both closing said first switch and also by activating said seventh transistor.

5. The system recited in claim 4, wherein said seventh transistor is activated by activating a third controlling circuit, said third controlling circuit is comprised of:
said first switch,
a reed relay comprised of:
  a normally open reed switch in series between said first switch and a gate of said seventh transistor,
  a coil wound around said reed switch, said coil is in series in a circuit between said vehicle battery and a first electrical load of the vehicle,
a resistive-capacitive network forming a sixth timer comprised of:
  a first resistor connected in series between said reed switch and said gate of said seventh transistor,
  a second resistor with a first electrical lead and a second electrical lead,
    a capacitor with a first electrical lead and a second electrical lead, said second lead is tied to said vehicle ground,
said second resistor and said capacitor are connected in parallel with each other such that a first lead of said second resistor and said first lead of said capacitor are tied together between said first resistor and said gate of said seventh transistor, said second lead of said second resistor is tied to said second lead of said capacitor,
closing said first switch activates said third controlling circuit, activating said third controlling circuit energizes said coil and closes said reed switch and also activates said sixth timer, activating said sixth timer activates said seventh transistor.

6. A system recited in claim 5, wherein said first electrical load of the vehicle is a cellular phone.

7. A system recited in claim 6, wherein said seventh transistor is activated by activating a fourth controlling circuit, said fourth controlling circuit is comprised of:
  a third switch, said third switch is normally open and tied to said positive pole of the vehicle battery,
  said sixth timer, closing said third switch activates said fourth controlling circuit, activating said fourth controlling circuit activates said seventh transistor.

8. A system recited in claim 7, wherein said first controlling circuit and said second controlling circuit are both by-passed such that:

said first group of relays is engaged by closing a fourth switch, said fourth switch is normally open and in a circuit between said vehicle ground and said end of said coils of said first group of relays, said other end of said coils of said first group of relays is tied to said positive pole of the vehicle battery, said second group of relays is engaged by closing a fifth switch, said fifth switch is normally open and in a circuit between said vehicle ground and said end of said coils of said second group of relays, said other end of said coils of said second group of relays is tied to said positive pole of the vehicle battery.

9. A system recited in claim 8, wherein said third relay has a third set of contacts, said third set of contacts is normally closed and in series in a circuit between a second electrical load of the vehicle and said vehicle battery, engaging said third relay opens said third set of contacts and opens said circuit between said second electrical load of the vehicle and said vehicle battery.

10. A system recited in claim 9, wherein said second electrical load is a radio of the vehicle.

11. A system recited in claim 10, wherein a normally open sixth switch is connected in parallel with said third set of contacts of said third relay, and a normally open seventh switch is connected in series with said third set of contacts of said third relay, said sixth switch and said seventh switch are both located between said vehicle battery and said second electrical load of the vehicle, closing said sixth switch connects said second electrical load of the vehicle to said vehicle battery with said third set of contacts of said third relay open, closing said seventh switch with said third set of contacts of said third relay closed and said sixth switch open connects said second electrical load of the vehicle to said vehicle battery.

12. A system recited in claim 10, wherein said seventh switch is connected in series with a set of normally closed contacts of a fourth relay between said vehicle battery and said second electrical load of the vehicle, said fourth relay has an end of its coil tied to said first switch, an other end of said coil of said fourth relay is tied to an eighth switch, said eighth switch is normally open and tied to said vehicle ground, closing said eighth switch with said first switch closed engages said fourth relay and opens said set of contacts of said fourth relay, opening said set of contacts of said fourth relay disconnects said vehicle battery from said second electrical load.

13. A system recited in claim 12, wherein activating a fifth controlling circuit engages said fourth relay, said fifth controlling circuit is comprised of:

said first switch tied to said end of said coil of said fourth relay, an eighth transistor with a collector tied to said other end of said coil of said fourth relay, an audio frequency responsive circuit connected to said first switch and also connected to a base of said eighth transistor, a microphone for receiving an audio frequency, said microphone is connected to said first switch and also connected to said audio frequency responsive circuit, closing said first switch activates said microphone to receive said audio frequency, reception of said audio frequency activates said audio frequency responsive circuit, activating said audio frequency responsive circuit activates said eight transistor, activating said eighth transistor engages said fourth relay.

14. A system recited in claim 13, wherein a fifth relay with a set of normally open contacts is engaged by activating a sixth controlling circuit, said sixth controlling circuit is comprised of:

said first switch tied to an end of the coil of said fifth relay, said first set of contacts of said third relay, a ninth transistor, said ninth transistor has a collector tied to an other end of said coil of said fifth relay, said ninth transistor is activated by a circuit comprised of:

a seventh timer, said seventh timer is in a circuit between said first set of contacts of said third relay and said ninth transistor, said first transistor, closing said first switch activates said sixth controlling circuit, activating said sixth controlling circuit activates said seventh timer and also engages said third relay, engaging said third relay activates said first transistor with said first switch closed, activating said first transistor enables said ninth transistor, said activating said seventh timer also activates said enabled ninth transistor, activating said enabled ninth transistor engages said fifth relay and closes said set of contacts of said fifth relay.

15. A system recited in claim 14, wherein said set of contacts of said fifth relay is in a circuit between said vehicle battery and an air conditioning/climate control system of the vehicle, closing said set of contacts of said fifth relay activates said air conditioning/climate control system with said ignition switch of the vehicle closed.

16. A system recited in claim 15, wherein a sixth relay with a set of normally open contacts is engaged by both closing said first switch and also by activating a seventh controlling circuit, said first switch is tied to an end of the coil of said sixth relay, an other end of said coil of said sixth relay is tied to said seventh controlling circuit, said seventh controlling circuit is comprised of:

said first switch, said second set of contacts of said third relay, a tenth transistor with a collector tied to said other end of said coil of said sixth relay said tenth transistor is activated by a circuit comprised of:

an eighth timer, said eighth timer is in a circuit between said second set of contacts of said third relay and said tenth transistor, said third transistor, engaging said third relay activates said eighth timer with said first switch closed, disengaging said third relay with said first switch closed following said engaging of said third relay activates said third transistor, activating said third transistor enables said activated tenth transistor, said enabling of said activated tenth transistor engages said sixth relay and closes said set of contacts of said sixth relay.

17. A system recited in claim 16, wherein said set of contacts of said sixth relay is in a circuit between said vehicle battery and said air conditioning/climate control system of the vehicle, closing said set of contacts of said sixth relay deactivates said vehicle air conditioning/climate control system with said ignition switch of the vehicle closed.

18. A system recited in claim 17, wherein a seventh relay with a set of normally open contacts is engaged by closing said second set of contacts of said third relay, said seventh relay has an end of its coil tied to said second contact set of said third relay, an other end of its coil is tied to a ninth switch, said ninth switch is normally closed and tied to said vehicle ground, opening either said second set of contacts of said third relay or opening said ninth switch disengages said seventh relay.

19. A system recited in claim 18, wherein said set of contacts of said seventh relay is in a circuit between said vehicle battery and an air conditioning system of the vehicle, closing said set of contacts of said seventh relay activates said air conditioning system, opening said set of contacts of said seventh relay deactivates said air conditioning system.

20. A system recited in claim 19, wherein said first timer is tied to a tenth switch, said tenth switch is normally open and tied to said vehicle ground, closing said tenth switch deactivates said first timer.

21. A system recited in claim 20, wherein said first timer, and said second timer, and said third timer, and said fourth timer, and said fifth timer, and said seventh timer, and said eighth timer are each comprised of a resistive-capacitive network.

* * * * *